United States Patent [19]
Wyatt et al.

[11] Patent Number: 5,786,643
[45] Date of Patent: *Jul. 28, 1998

[54] HEAT RETENTIVE SERVER FOR INDUCTION HEATING

[75] Inventors: W. Burk Wyatt, Brentwood; Ray Russell Fox, Nashville, both of Tenn.

[73] Assignee: Aladdin Synergetics, Inc., Nasville, Tenn.

[*] Notice: The term of this patent shall not extend beyond the expiration date of Pat. No. 5,603,858.

[21] Appl. No.: 755,218

[22] Filed: Nov. 22, 1996

Related U.S. Application Data

[62] Division of Ser. No. 458,296, Jun. 2, 1995.

[51] Int. Cl.$^6$ .................................................. H05B 6/12
[52] U.S. Cl. .................. 219/621; 219/622; 126/375; 126/400; 99/DIG. 14
[58] Field of Search .................. 219/621, 620, 219/622, 623, 624, 647, 649, 732, 759; 126/245, 375, 400; 99/DIG. 14, 455; 426/237, 241, 243

[56] References Cited

U.S. PATENT DOCUMENTS

| | | |
|---|---|---|
| 1,049,385 | 1/1913 | Mohrenwitz . |
| 2,830,576 | 4/1958 | Torino et al. . |
| 3,054,395 | 9/1962 | Torino . |
| 4,182,405 | 1/1980 | Hysen et al. . |
| 4,453,068 | 6/1984 | Tucker et al. . |
| 4,533,807 | 8/1985 | Minamida . |
| 4,544,818 | 10/1985 | Minamida . |
| 4,567,877 | 2/1986 | Sepahpur . |
| 4,596,236 | 6/1986 | Eide . |
| 4,614,852 | 9/1986 | Matsushita et al. . |
| 4,667,074 | 5/1987 | Kubo et al. . |
| 4,776,386 | 10/1988 | Meier . |
| 4,777,931 | 10/1988 | Ziegler et al. . |
| 4,790,292 | 12/1988 | Kuhn . |

(List continued on next page.)

FOREIGN PATENT DOCUMENTS

| | | |
|---|---|---|
| 2447174 | 8/1980 | France . |
| 668968 | 3/1994 | Japan . |
| 950885 | 2/1964 | United Kingdom . |
| 1257896 | 12/1971 | United Kingdom . |

OTHER PUBLICATIONS le;2qSECO Products Corporation data sheet entitled, "Quick-Temp". Printed at the bottom left-hand corner of the second page of the document, is Q-T4/96, which may or may not reference a date.
Produce line catalog for Therma-Systems Corporations, South Plainsfield, New Jersey.
International Search Report.
English Language Abstract of JP (A) 6–68968.
"Meal Service Systems, Therma™Systems Products & Solutions for Every Meal Service Problem" (undated sales material of SECO Products Corporation, 3 pp.).
"Hotechnology Now Seco Can Dramatically Improve the Performance of Your Tray Make–up Line ... Start to Finish" (undated sales material of SECO Products Corporation, 2 pp).
An Unverified Translation of French Patent No. 79 01787.

Primary Examiner—Philip H. Leung
Attorney, Agent, or Firm—Greenblum & Bernstein P.L.C.

[57] ABSTRACT

A heat retentive server adapted to the inductively heated comprises a central portion comprising a heat storage member comprising a material which is susceptible to being heated by induction; and an outer peripheral member connected to the central portion so that said outer peripheral member and the central portion are substantially thermally insulated from each other. Preferably, the server is provided with heat insulation constructed and arranged with respect to the heat storage member so that heat is caused to primarily flow upwardly from the heat storage member. Also preferably, the outer peripheral member and the central portion are substantially insulated from each other by means of a thermal break.

65 Claims, 11 Drawing Sheets

U.S. PATENT DOCUMENTS

| | | |
|---|---|---|
| 4,881,590 | 11/1989 | Meier . |
| 4,908,489 | 3/1990 | Panecki et al. . |
| 4,910,372 | 3/1990 | Vukich . |
| 4,917,076 | 4/1990 | Nadolph et al. . |
| 4,982,722 | 1/1991 | Wyatt . |
| 5,016,756 | 5/1991 | Wischhusen et al. . |
| 5,052,369 | 10/1991 | Johnson . |
| 5,053,593 | 10/1991 | Iguchi . |
| 5,064,055 | 11/1991 | Bessenbach et al. . |
| 5,069,273 | 12/1991 | O'Mearne . |
| 5,070,222 | 12/1991 | Yanav et al. . |
| 5,116,240 | 5/1992 | Wischhusen et al. . |
| 5,125,391 | 6/1992 | Srivastava et al. . |
| 5,145,090 | 9/1992 | Wyatt . |
| 5,182,438 | 1/1993 | Oakes et al. . |
| 5,201,364 | 4/1993 | Tippmann et al. . |
| 5,201,797 | 4/1993 | Weng . |
| 5,243,171 | 9/1993 | Wood et al. . |
| 5,278,381 | 1/1994 | Rilly . |

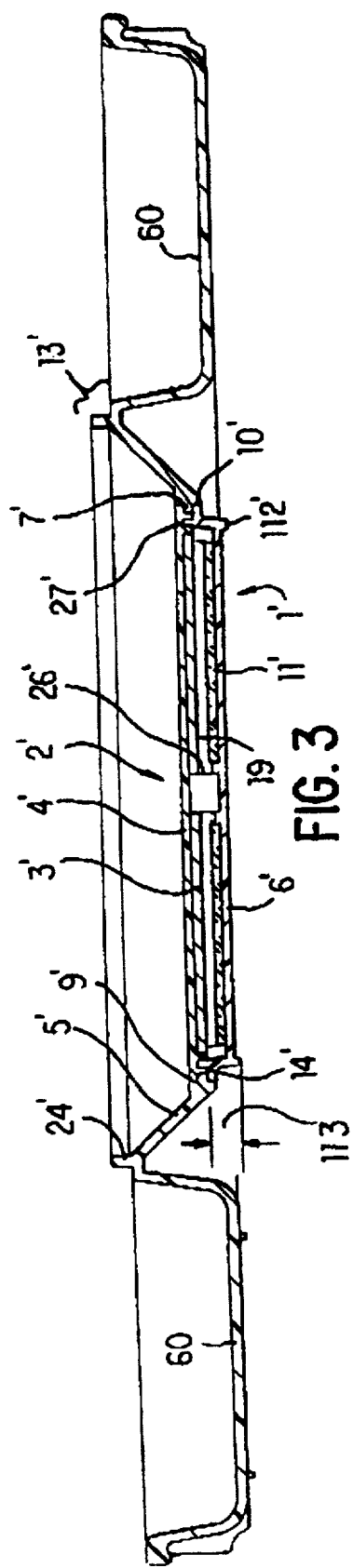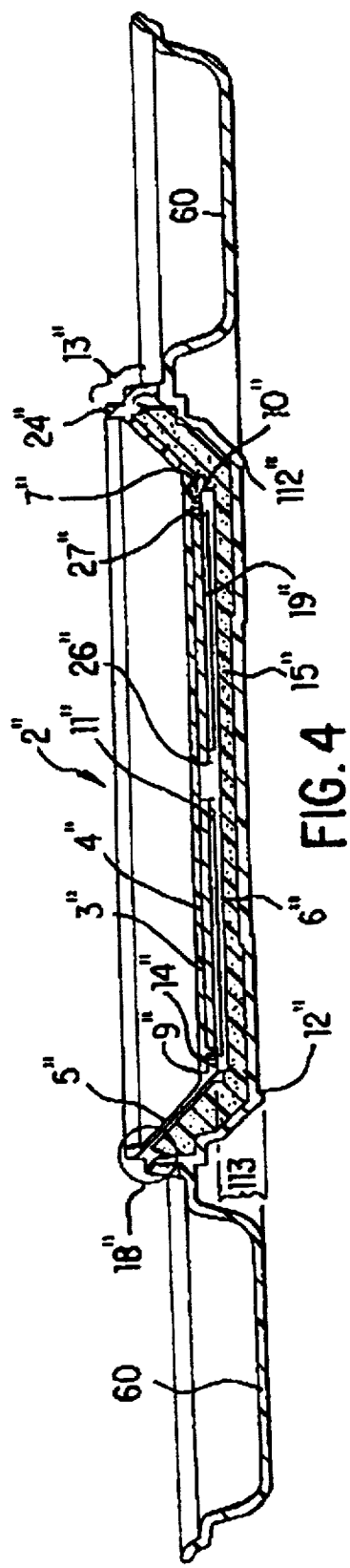

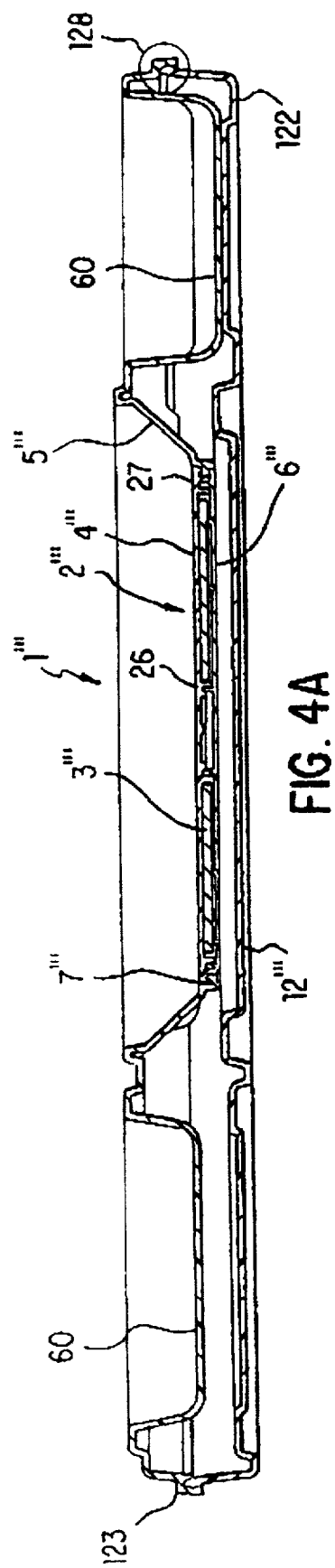

HEAT RETENTIVE SERVER FOR INDUCTION HEATING

This application is a division, of application No. 08/458,296, filed Jun. 2, 1995, now U.S. Pat. No. 5,603,858.

BACKGROUND OF THE INVENTION

1. Field of the Invention

The present invention relates to a heat storage dish, and particularly a heat retentive server which is adapted to be heated by electrical induction.

2. Description of Background Information

In environments where food is prepared and cooked in a central location and distributed and served to consumers who are remotely located, such as in hotels, in aircraft and in institutional settings such as hospitals and nursing homes, there is often a delay between the time that the food is prepared, cooked and subsequently placed on a plate or other serving dish, and the time that the food is eventually presented to the consumer for consumption at a remote location, such as a hotel room, hospital room, on aircraft, etc. Accordingly, by the time the food is presented to the consumer, the food can become cold unless special measures are taken to keep the food hot. Various approaches to such meal service problems encountered in such service environments, sometimes referred to as "satelliting" have been employed in the food service and container industries.

One approach to solving such problems associated with the service of meals involves the use of heat retentive servers, serving trays having insulated portions therein, and/or serving containers which retain heat. Such containers typically are adapted to receive a plate containing portions of a meal which are to be kept hot. Such servers typically include an insulated base portion and an insulated dome portion, which together cooperate to define an insulated enclosure which is adapted to receive a plate having such heated meal portions thereon, and maintain the plate and the meal portions in an insulated environment. In some instances, the heat retentive server can include a portion which acts as a heat storage "battery", or a heat sink.

One such heat retentive server is disclosed in U.S. Pat. No. 4,982,722, issued Jan. 8, 1991 to WYATT, and assigned to Aladdin Synergetics, Inc., of Nashville, Tenn. The entirety of this patent is hereby incorporated by reference, as though set forth in full herein.

Such heat retentive servers can be designed to support dishware, which in turn holds a portion of a meal which is to be kept hot. In such circumstances, such a base is commonly called a "pellet" base, and the entire system, i.e., the base, dome and plate, is referred to as a "pellet system". When a heat sink is incorporated into a server base and the base supports a food-carrying dish, such as a plate, the base can be referred to as a plate warmer.

The heat sinks in such systems can include, e.g., a phase-change core, such as that disclosed in U.S. Pat. No. 4,982,722, incorporated by reference above. In other approaches, a solid heat sink can be employed.

In general, heat retentive servers employ convection or conduction heating in order to either heat a food service dish or heat a heat storage battery during food service operations.

U.S. Pat. No. 3,916,872 to KREIS et al., issued Nov. 4, 1975, discloses a heat storage dish comprising a central heat storage disk and an insulating member which surrounds the heat storage dish. The heat storage dish consists of a substantially circular metallic body member which may be equipped with a central opening. The heat storage dish may, in one embodiment, be heated by subjecting it to a high frequency field, thus inductively heating the heat storage dish. U.S. Pat. No. 3,557,774, issued Jan. 26, 1971 to KREIS discloses a heat storage dish having a heat storage plate enclosed between an interior wall and an exterior wall, secured at their edges to prevent the entry of any external substance.

U.S. Pat. No. 4,776,386 to MEIER, issued Oct. 11, 1988, discloses an apparatus for cooling, storing and reheating food using induction heating. This system includes a tray distribution system wherein a tray, which may be adapted to support, e.g., a soup tureen, a dish for meat, a hot beverage cup, a salad plate, and/or a similar plate such as a fruit dish, as well as a trough for cutlery, may be provided. A meal, supported on such a tray can be stored in a refrigerated environment. In this system, the refrigerated cabinet in which the trays are stored includes induction coils. In practice, prior to serving, the cooling system of the refrigerator is turned off and the induction coils are activated to supply heat to the appropriate areas in the tray. U.S. Pat. No. 4,881,590 to MEIER, issued Nov. 21, 1989, discloses a similar system.

U.S. Pat. No. 4,020,310 to SOUDER, Jr. et al., issued Apr. 26, 1977, and U.S. Pat. No. 4,110,587 to SOUDER, Jr. et al., issued Aug. 29, 1978, discloses containers which are specifically designed for induction heating.

U.S. Pat. No. 3,734,077 to MURDOUGH et al., issued May 22, 1973, discloses a server which includes a recess in order to receive a plate. The server comprises an upper shell, a lower shell, a heating pellet and a resilient pad. The pad occupies the space between the under surface of the pellet and the lower shell and performs an insulating function, in addition to directing heat from the pellet in an upward direction rather than downwardly or laterally.

Each of the forgoing systems suffers from disadvantages. For example, systems which employ convection or conduction heating to preheat a food service container prior to employing the food service container to support, e.g., a dish having a food portion which is to be kept hot, require long "lead times" prior to being capable of being effectively used. Thus, such systems require relatively long periods of time in order to preheat the convection systems or other ovens used with said systems and in order to store enough heat in a heat sink or other heat storage means before the container can be usefully employed to keep foods warm in food service environments. Such lead times are undesirable and are typically on the order of about 60 to about 90 minutes and sometimes even longer, prior to the start of delivery or serving of the food to individual consumers.

Such food service containers including heat retentive servers and the like, suffer from other disadvantages. For example, heat retentive servers possess the disadvantage that the entire server can become hot and difficult to handle safely.

Additional disadvantages include the fact that heat retentive servers which act as a heat sink, e.g., which employ a heat storage mass, tend to liberate heat in all directions. However, it is preferable to direct the heat which is liberated from the heat storage mass such that the heat is, liberated substantially only within the heat retentive server itself, i.e., that portion of the heat retentive server which is enclosed by the bottom portion, side walls and dome or lid of the server. To achieve such an object, it is preferable to direct the heat given up by the heat storage mass such that the heat is directed upwardly.

The foregoing approaches have failed to provide a heat retentive server wherein the outer portion, e.g., the outer wall portion, is substantially insulated from the central portion, containing the heat storage mass. Additionally, the foregoing approaches have failed to provide a heat retentive server containing a heat sink or heat storage mass which can be rapidly "charged" with stored heat so that the charging operation can coincide with the food placement operation, negating the need for preheating of the heat retentive server. Moreover, the foregoing approaches have generally failed to provide heat retentive servers which can be rapidly heated and prepared for service as described above, but which also provides relatively safe handling characteristics by virtue of having one or more outer peripheral surfaces which remain cool to the touch, and therefore facilitate safe handling. Thus, the foregoing approaches have failed to provide a heat-on-demand pellet system, capable of sequential heating and food placement and food dish placement, and yet which is safe to handle even under sequential, assembly line type conditions.

The foregoing drawbacks all contribute to reduce efficiency and, in some instances, reduce safety, in mass production food service operations as described above.

Thus, the foregoing approaches have failed to satisfy one or more of these aspects, and there has been a continuing need for improvement.

SUMMARY OF THE INVENTION

Accordingly, it is an object of the present invention to provide a heat retentive server, also referred to herein as a heat retentive serving module, which is adapted to be inductively heated and to also store heat in a heat sink so as to keep hot foods hot; the heat retentive server can also include a peripheral portion which is thermally insulated from the heat sink portion.

It is a further object of the invention to provide an inductively heated container wherein the heat contained within and liberated by the heat storage mass or heat sink is directed upwardly and towards the interior of the container where it is retained to maintain hot food hot, rather than allowing the heat to be liberated outwardly or downwardly.

It is a still further object of the invention to provide an inductively heated storage container which can be rapidly heated and ready for use in serving individual hot portions to individual consumers, in such fashion that a large number of such heat retentive servers can be "charged" (preferably sequentially), and plated with food in mass production fashion, without requiring a substantial lead time, for preheating ovens or other equipment.

A yet further object of the invention is to provide a heat retentive server wherein the peripheral portions are cool to the touch and which thus facilitate safe handling even under mass production conditions.

Thus, a still further object of the invention is to provide a heat retentive server which includes a heat storage mass which is substantially thermally insulated from peripheral portions of the server by means of a space or thermal break.

An additional object of the invention is to provide a server which meets the foregoing criteria and which can be in the form of a heat retentive server for receiving a plate, and/or which can also be incorporated as part of a food service tray.

The present invention provides a heat retentive server, e.g., a container such as a plate, serving tray, or the like which can be heated by induction heating to keep selected foods hot. The containers include a metal portion or layer which functions to heat the container in response to electrical or electromagnetic induction, e.g., by induction heating. The metal layer is preferably generally centrally located (in top plan view) and preferably circular, but can be positioned in various locations and comprise other than a circular shape. The metal layer can be located within or adjacent to a non-metallic central support portion. Further, the central support portion can be thermally isolated from the remainder of the structure of the container, e.g., the side walls, peripheral tray portions, bottom wall, etc., such that heat is not conducted to these portions, such as by using a thermal break and/or insulation. For example, a thermal break is preferably incorporated as part of an expansion joint located between the heat storage mass and peripheral portions of the heat retentive server, and insulation is preferably provided in bottom portions thereof.

The central support portion, which may be circular, can include an outer peripheral member connected thereto in such fashion that heat is not conducted to the outer peripheral member. In some embodiments, the outer peripheral member can be the slanted side wall of the container and, in some embodiments is provided at an expansion joint between the support portion and the outer ring. In some embodiments, as discussed above, the expansion joint comprises a thermal break.

In preferred embodiments, an inner flange of the outer peripheral member is disposed between a flange member on the central support or base portion and, optionally, an additional member. This is preferably accomplished in non-contact fashion to form an expansion joint which functions as a thermal break to isolate the outer peripheral member and the rest of the container from the heat given up by the metal layer. The central base portion thus remains hot for maintaining hot foods hot, while the outer peripheral member remains at ambient temperatures, which facilitates safe handling.

Thus, in another aspect, the invention provides a heat retentive server which is adapted to be inductively heated. The server comprises a central portion comprising a heat storage member comprising a material which is susceptible to being heated by inductive heating, and the heat storage member is secured to a connecting member. An outer peripheral member is provided which is secured to the connecting member and which is substantially thermally insulated from the heat storage member.

The outer peripheral member can have any shape, and can, in top plan view, entirely surround the central portion, or can surround less than the entire circumference of the central portion. In preferred embodiments, the outer peripheral member is ring-shaped, and preferably surrounds the entire circumference of the central portion.

In preferred embodiments, the central portion comprises an upward, generally disk-shaped member, a lower generally disk-shaped member, and a generally disk-shaped heat storage member therebetween. The outer generally ring-shaped member, in such cases, is retained by at least one of the upward generally disk-shaped members and the lower generally disk-member and is substantially insulated from the upper and lower generally disk-shaped members by a thermal break. In still other embodiments, an additional bottom cover member can be secured to the generally ring-shaped member. Additionally, the heat retentive server can further comprise an upper cover or dome and the upper cover and the central portion can cooperate to define an insulated volume. Preferably, the bottom cover member is secured to the generally ring-shaped member by an interlocking, snap-fit connection.

In still other embodiments, the ring comprises a generally planar expanse which is preferably in the form of a tray. In such embodiments, the ring is formed integrally with the portion of the heat retentive server which also forms a standard serving tray. In other embodiments, the bottom cover extends to form the standard serving tray, and in such embodiments, the serving tray is formed integrally with the bottom cover.

The generally disk-shaped heat storage member preferably comprises a ferrometallic material, such as an iron-containing material, e.g., steel. The heat storage member is preferably in the form of a metal disc, preferably formed of steel, and most preferably hot rolled or cold rolled steel. The steel can be either cold rolled or hot rolled. Preferably, the steel is 1010 hot rolled steel, having a carbon content of from about 8 to about 13 percent.

In some embodiments, an inner rim portion of the generally ring-shaped member is retained in a generally annular volume defined by the generally disk-shaped upper member and the generally disk-shaped lower member which cooperate to retain the heat storage member, and in such fashion that a substantial proportion of the inner rim portion of the generally ring-shaped member is not in contact with the upper generally disk-shaped member or the lower generally disk-shaped member. This can be facilitated by a suitable sealing compound. This is accomplished by interposing the sealing compound between the members that retain the heat storage member, and the peripheral member, i.e., the ring-shaped member, in those embodiments wherein the ring-shaped member comprises the peripheral member.

Preferably, the annular volume and inner rim portion cooperate to form the expansion joint. In such embodiments, the annular volume is defined by the upper and lower members which retain the heat storage member and the inner rim portion of the generally ring-shaped member comprise the expansion joint, and the annular volume is at least partially filled with sealing compound.

In method aspects, the invention provides a method of serving food to a plurality of consumers in institutional settings. In such embodiments, the method comprises the steps of:

A. subjecting a heat retentive server comprising a heat storage member which is susceptible to electrical induction heating to an electromagnetic field sufficient to inductively heat said heat storage member;

B. placing a quantity of food in a heated plate on said heat retentive server;

C. covering the heat retentive server with an upper cover or dome effective to define an insulated volume between the cover and the heat retentive server; and D. providing the dish to at least one of a plurality of consumers.

In other embodiments, the method can include a holding step prior to step D. The holding step can have a duration of from about 5 to about 75 minutes, preferably from about 10 to about 45 minutes. Most preferably the method includes aspects wherein the food is placed in heat exchange relationship with the heat storage member and step D above is conducted by providing a heat retentive server containing a food serving dish containing the food to be distributed to a plurality of consumers. The invention provides advantages wherein the heating step A can be conducted from a period from about 5 to about 15 seconds, especially about 8 to about 12 seconds. In preferred embodiments, step A is initiated by placing the heat retentive server on an induction heater, and activating a proximity switch in response to placing the heat retentive server on the induction heater.

The invention also involves method of manufacture aspects, which are discussed in more detail below.

BRIEF DESCRIPTION OF THE DRAWINGS

The foregoing and other objects, features, and advantages of the invention will be apparent from the following more particular description of the preferred embodiments, as illustrated in the accompanying drawings, in which reference characters refer to the same parts throughout the various views, and wherein:

FIG. 3 is a generally transverse cross-section, taken along a plane similar to that of FIG. 1 of a heat retentive server of the invention, wherein the outer peripheral member or ring shaped member further comprises a generally planar expanse, which extends to form a serving tray portion of a heat retentive server of the invention;

FIG. 4 is a generally transverse cross-section of FIG. 3, wherein a bottom cover member further comprises a generally planar expanse, which extends to form a serving tray portion of a heat retentive server of the invention;

FIG. 4a is a generally transverse cross-section showing an alternate embodiment of the invention, wherein the bottom cover member extends to the periphery of a generally planar portion;

DETAILED DESCRIPTION OF PREFERRED EMBODIMENTS OF THE INVENTION

Figure 1:
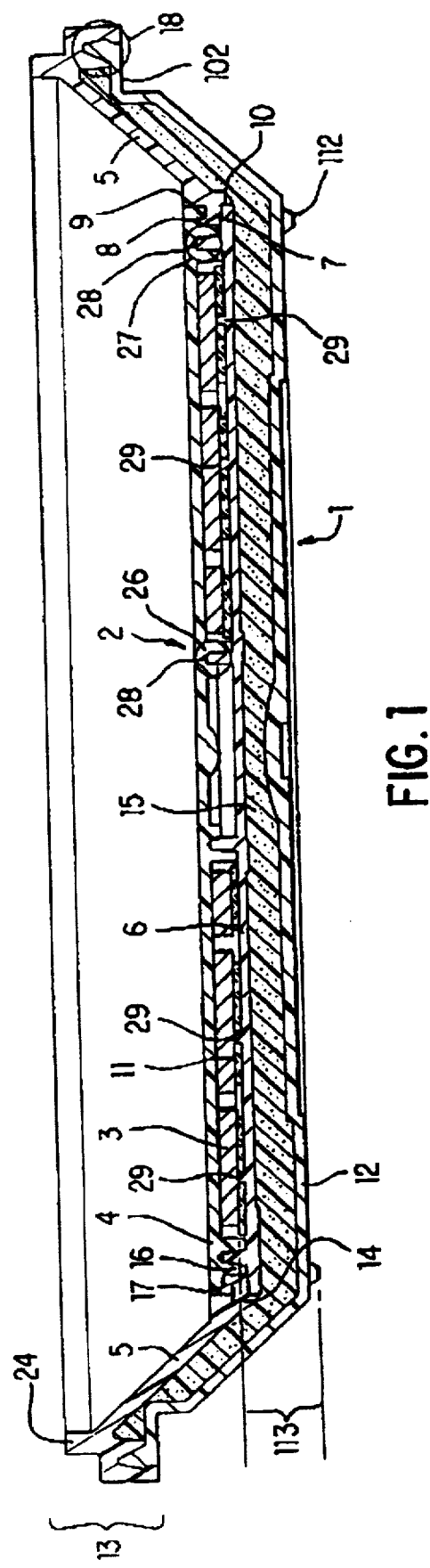
FIG. 1 is a generally transverse cross-section of one embodiment of the invention.

FIG. 1 is a schematic representation of a heat retentive server of the invention, generally designated as 1, in transverse cross-section. The heat retentive server of this embodiment comprises a generally disk-shaped central portion generally designated as 2. The generally disk-shaped central portion comprises a generally disk-shaped heat storage disk 3.

In the embodiment shown in FIG. 1, the generally dish-shaped member 4 comprises a generally disk-shaped upper member, against which the heat storage disk is retained. One way of retaining the heat storage disk within the generally disk-shaped central portion is to provide a lower member 6 which, in the embodiment of FIG. 1, is also generally disk-shaped. In such embodiments, lower member 6 cooperates with the upper generally disk-shaped member 4 to substantially surround the heat storage disk. Member 4 may serve, among other functions, as a connecting member by means of which an outer peripheral ring 5 may be maintained in place with respect to the central heat storage disk 3. In some embodiments, the outer ring 5 can be maintained in relationship with heat storage disk 3 by means other than the connecting member, with or without suitable cooperating means to maintain such relationship.

The lower generally disk-shaped member 6 is secured to the upper generally disk-shaped member 4. Suitable securing means include, but are not limited to, e.g., sonic welding, e.g., ultrasonic welding. Other ways to secure lower member 6 to upper member 4 include solvent welding, spin welding, adhesive bonding, etc. The particular way of securing lower member 6 to upper member 4 can be optimized depending on the particular materials selected to be employed in the upper member 4 and lower member 6. The particular way of securing these members together can be readily selected by those of ordinary skill in the art.

In the embodiment of FIG. 1, securing is accomplished through ultrasonic weld joints. In this embodiment, an inner annular ultrasonic weld joint 26 and an outer ultrasonic weld joint 27 are employed. Preferably, the annular ultrasonic weld joints 26 and 27 are provided with a lead 28 which, during welding operations, spreads or flashes up each side of the weld joint. Additionally, the upper member 4 and lower member 6 are provided with cooperating extensions 29 and 41 which are generally transverse to the plane of the central member and which project through cooperating holes 51 in the heat storage member. These members cooperate so that a third type of ultrasonic weld joint is preferably provided in the heat retentive server, which is in the form of a plurality of generally pillar shaped weld joints or swaged posts 29. The structure of portions of the inner and outer annular members and generally pillar shaped members or swage posts provided on upper member 4 and lower member 6, prior to welding, are discussed in more detail below.

Preferably, the ultrasonic welding of outer ultrasonic weld joint 27 is accomplished with an ultrasonic welding horn sized and configured to impart ultrasonic energy of sufficient frequency, amplitude and direction to the outer weld joint 27. The ultrasonic welding horns employed are preferably fabricated and optimized for the proper configuration and tuning which corresponds to the joint being welded. Thus, for joint 27, the ultrasonic welding horn is conventional and design, fabrication and optimization of a suitable ultrasonic welding horn can readily be made by those of ordinary skill in the art. A relatively smaller ultrasonic welding horn is employed for the inner annular weld joint 26, and the horn and design, fabrication and optimization thereof are also conventional. Additionally, the horn used to weld the post or pillar joints comprising swaged posts 29 is complementary to the location and shape of the posts and can be readily designed, fabricated and optimized by those of ordinary skill in the art.

Alternatively, lower member 6 and upper member 4 cooperate to partially enclose the heat storage member 3. In another alternative, the heat storage disk can be integrally injection molded as a member of the central disk-shaped portion.

In the embodiment of FIG. 1, wherein the upper generally disk-shaped member 4 functions as a connecting member, the upper generally disk-shaped member 4 and lower generally disk-shaped member 6 cooperate to form an annular volume or opening 14, within which the inner peripheral rim 7 of the outer peripheral ring 5 is received and retained. Alternatively, upper member 4 and lower member 6 could be integrally molded as a single piece surrounding the heat storage member 3. Thus, lower member 6 can be integral with and part of upper member 4 in such embodiments.

In the embodiment of FIG. 1, the inner rim 7 of outer peripheral ring-shaped member 5 is generally hook-shaped and is received in a corresponding annular opening 14 of corresponding shape defined in the outer periphery of the central generally disk-shaped member, which in turn is defined by upper member 4 and lower member 6, in the embodiment of FIG. 1. Thus, the inner rim member 7 can comprise a generally hook-shaped member 8, which hook member also has generally vertically extending inner wall 16 and outer wall 17 which cooperate with a similarly formed recess 14, described above, defined by the periphery of upper member 4 and lower member 6.

The interior rim portion 7 projects from a generally vertical interior face of the outer peripheral ring member 5. In the embodiment of FIG. 1, the generally vertical inner peripheral face comprises upper face portion 9 and lower face portion 10. In preferred embodiments, the volume surrounding the generally hook-shaped member 8, and preferably the volume surrounding interior rim portion 7 projecting from interior faces 9 and 10, is surrounded by a sealing composition or compound. A suitable sealing composition comprises RTV sealant. Such sealants are commercially available and preferred sealants are food grade RTV sealants. This joint comprises a thermal break. As used herein, the term "thermal break" refers to the inability of two or more parts to transmit heat one to the other by conduction due to a lack of direct contact between the parts which are subject to the thermal break, whereby the parts are "substantially thermally insulated from each other".

In the embodiment of FIG. 1, the upper member 4, lower member 6, and the inner peripheral rim 7 of ring-shaped member 5 cooperate to form an expansion joint which also functions as a thermal break. In this embodiment, the outer ring-shaped member is substantially thermally insulated from the central portion 2.

Central portion 2 is preferably provided with a sheet of fiberglass insulation 11 below the generally disk-shaped heat storage member 3. The fiberglass sheet 11 may also be retained in place by lower member 6.

Figure 5:
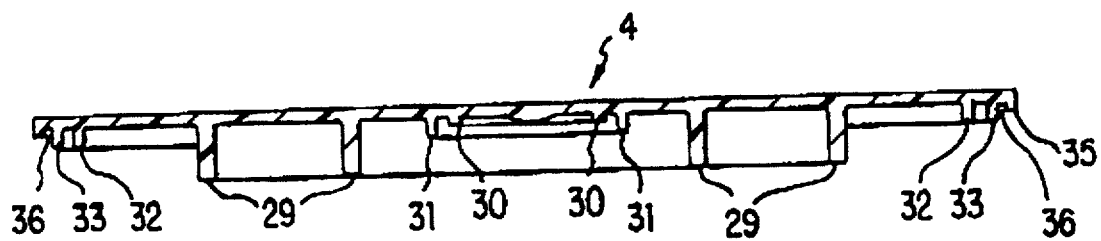
FIG. 5 is a generally transverse cross-section of upper member 4 of FIG. 1, prior to assembly of the heat retentive server of the invention.
Figure 6:
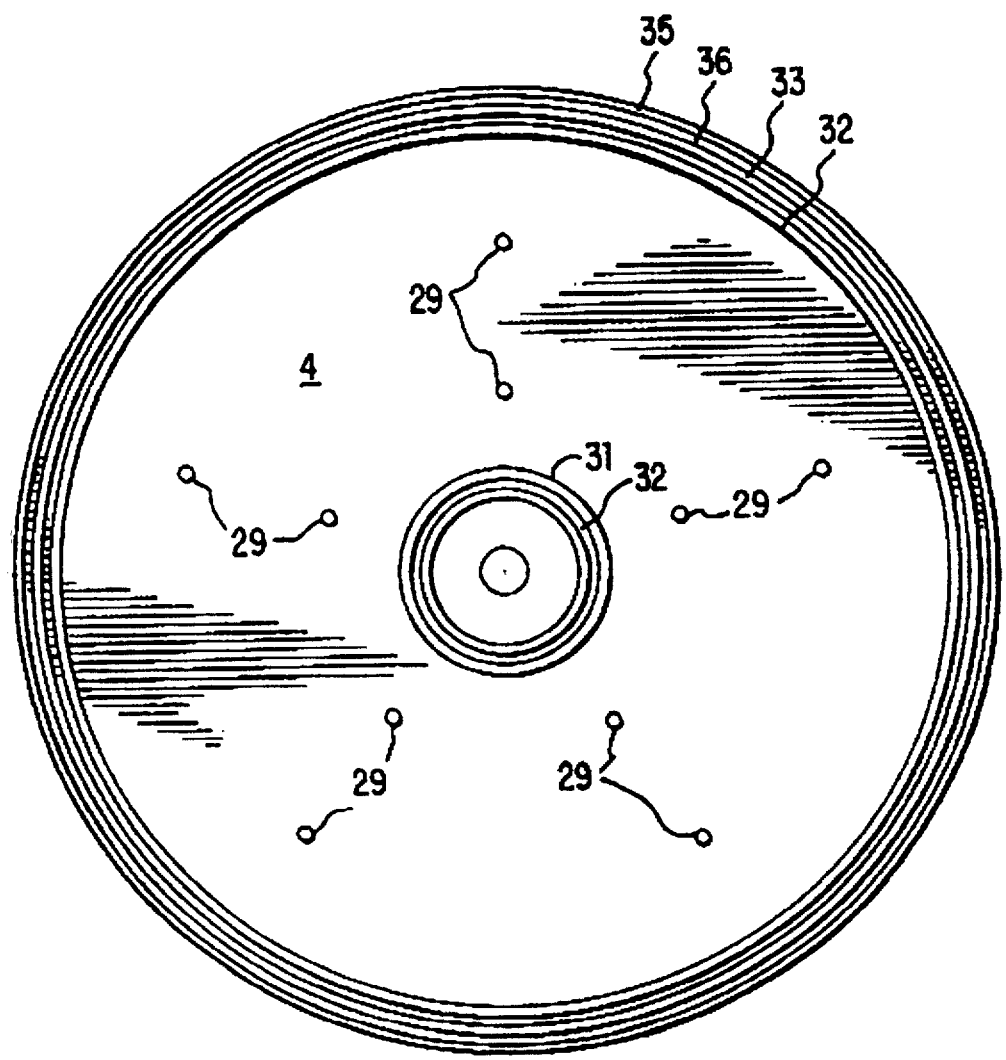
FIG. 6 is a top plan view of the upper member of FIG. 5, prior to assembly of the heat retentive server of the invention.

As is shown in FIGS. 5 and 6, upper member 4 is preferably provided with a plurality of generally pillar shaped members, or swage posts are provided which are generally transverse to the plane of upper member 4. Upper member 4 is also provided with a pair of annular ribs 30 and 31 which together form a portion of the inner annular weld joint 26, and a second pair of annular ribs 32 and 33 which together form a portion of the outer annular weld joint 27. The periphery of upper member 4 is provided with an annular rib 35, which defines an annular groove 36. Once assembled, rib 35 cooperates with a peripheral portion 37 of lower member 6 to retain the inner peripheral portion or rim 7 of peripheral member or outer ring 5. In preferred embodiments, annular rib 35 and annular groove 36 of the upper member and peripheral portion 37 of lower member 6 cooperate to define an annular void.

Figure 12:
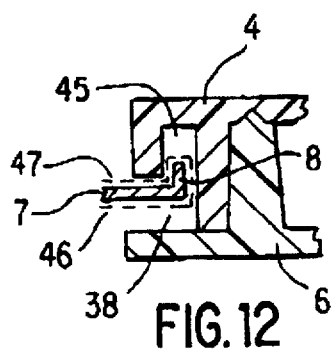
FIG. 12 is an enlarged schematic cross-section of upper and lower members of a heat retentive server of FIG. 1, which cooperate to define an annular recess forming part of an expansion joint of the invention employing a thermal break employed in the embodiment of FIG. 1.

Referring to FIG. 12, upper member 4 and lower member 6 cooperate to define an annular void 38 which retains the inner rim portion 7 of peripheral member or ring 5. Preferably, this is accomplished by means of a cooperating hook portion 8 of the peripheral member or ring 5. Thus the annular void 45 comprises a generally vertical portion 45 and generally horizontal portion 46. Inner rim portion 7, including generally hook shaped member 8 are not in contact with upper member 4 or lower member 6, and this serves to provide a thermal break, illustrated by dotted line 47. Preferably, annular void 45 is filled with a sealant, such as the RTV sealant discussed above.

Figures 9, 10, 11:
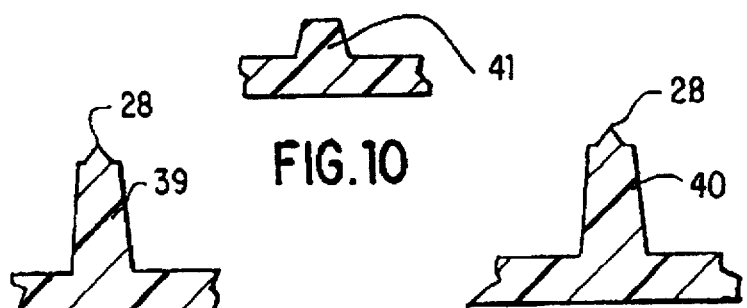
FIG. 9 is an enlarged cross-section of portion C of FIG. 7, showing a schematic representation of a preferred outer rib and lead for ultrasonic welding, prior to assembly of the heat retentive server of the invention.
FIG. 10 is an enlarged cross-section of portion B of FIG. 7, showing a schematic representation of a preferred rib for ultrasonic welding, prior to assembly of the heat retentive server of the invention.
FIG. 11 is an enlarged cross-section of portion A of FIG. 7, showing a schematic representation of a preferred outer rib and lead for ultrasonic welding, prior to assembly of the invention.

The outer rib 40 is shown schematically in FIG. 9, and inner rib 39 is shown schematically in FIG. 11. Each of these ribs 39 and 40 is provided with an annular lead 28 which during welding melts and flows to each side of the sonic weld joint.

FIG. 10 shows a typical truncated cylindrical projection 41 which cooperates to form a pillar shaped swage joint which extends between holes 51 of the heat storage member.

Figure 8:
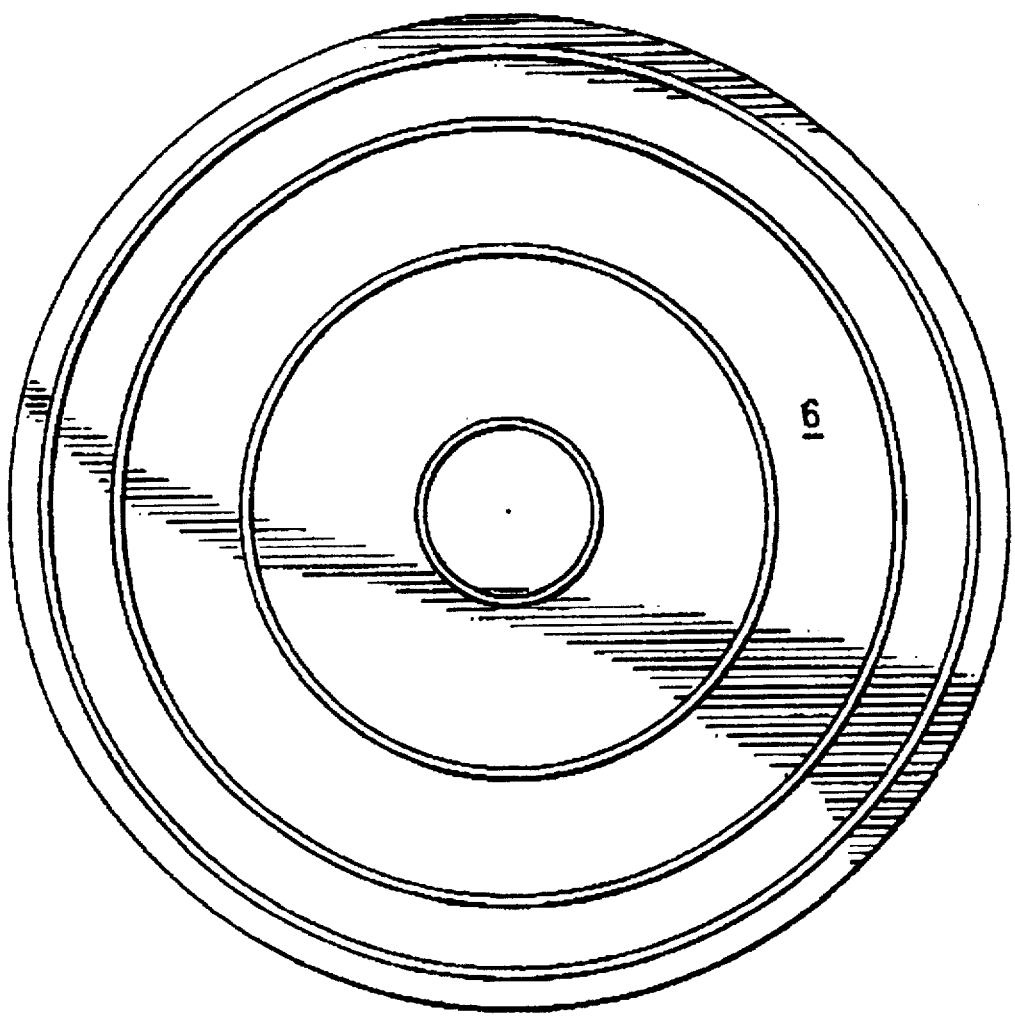
FIG. 8 is a top plan view of the lower member of FIG. 7, prior to assembly of the heat retentive server of the invention.
Figure 7:
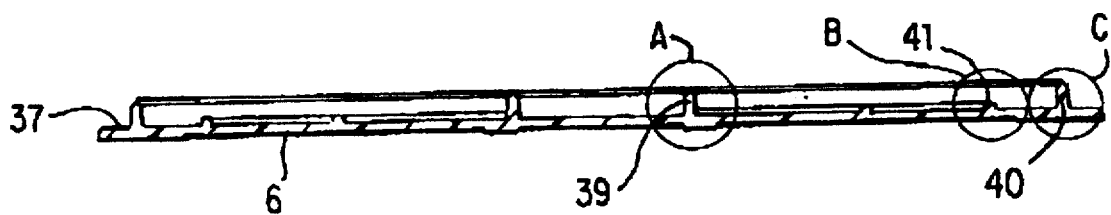
FIG. 7 is a generally transverse cross-section of lower member 6 of FIG. 1, prior to assembly of the heat retentive server of the invention.

Referring to FIGS. 7 and 8, the lower member 6 is preferably formed with an inner annular rib 39 for cooperating with inner rib 30 and outer rib 31 of upper member 4 shown in FIGS. 5 and 6, which in assembly cooperate to form the inner weld joint 26 shown in FIG. 1. An outer rib 40 is provided on lower member 6 for cooperating with the inner rib 32 and outer rib 33 of upper member 4 shown in FIGS. 5 and 6 to form the outer weld joint 27 shown in FIG. 1. Additionally, generally truncated post or pillar shaped portion 41 is provided.

Additionally, a bottom cover 12 is preferably provided. In the embodiment of FIG. 1, the bottom cover is secured to the outer ring 5 at the upper or outer rim portion 13, of ring 5. Preferably, the bottom cover is secured to the ring by means of a "snap-fit" connection 18. As used herein, the term "snap-fit" connection refers to the type of connection and technology which is the subject of U.S. Pat. No. 5,145,090 to WYATT, issued on Sep. 8, 1992. The entirety of this patent is hereby incorporated by reference as though set forth in full herein.

Bottom cover 12 can be secured to peripheral member 5 at outer rim or upper portion 13, at or near lower or inner rim portion 7, or anywhere therebetween.

The area between the bottom cover 12 and the central portion 2 and ring portion 5 defines an insulating space which can be filled with an insulating foam 15. The foam can be an open or closed cell foam. A closed cell foam is preferred. The foam may also be foamed-in-place as disclosed in U.S. Pat. No. 5,145,090. When foamed in place, such foams facilitate the snap-fit connection, as disclosed therein. Suitable foams include, but are not limited to, self-expanding foams such as polyurethane. Preferably, the foam serves to force together the interlocking members which comprise the snap fit connection.

Alternatively, as shown in FIG. 4a, the bottom cover member 122, can extend to the periphery 123 of generally planar expanse 60 and is secured thereto by the snap-fit construction 128, similar to snap-fit construction described above.

The heat retentive server of the invention is preferably constructed and arranged so as to direct the heat which is stored in and liberated from the heat storage member such that the heat is retained within the insulated interior of the server defined by the central portion, the outer ring-shaped periphery and the insulated dome. This is preferably accomplished by directing the liberated heat upwardly from the heat storage disk to the interior of the server. In some embodiments, this is preferably accomplished by means of the layer of foam 15 disposed between the bottom cover on the one hand, and the central portion and outer ring-shaped peripheral member on the other hand. The insulation thus serves to reduce or prevent heat loss from the side and bottom of the container and directs the heat upwardly and inwardly to direct the heat to a plate containing food and supported by upper member 4. The layer of fiberglass insulation 11 is also additionally employed for this purpose. Foam 15 and fiberglass 11 can be used alternatively or in combination. Thus, in the embodiment of FIG. 3, since no bottom cover member 12 is employed, a layer of insulation 11 is preferably employed, which is preferably fiberglass, while in the embodiments of FIGS. 1 and 4, both foam 15 and fiberglass 11 are preferably employed. In the embodiments of FIGS. 1 and 4, the layer of fiberglass 11 can be omitted.

The outer ring-shaped peripheral member can be formed of any suitable material, such as a plastic material, preferably an injection-moldable plastic material such as a polyolefin-based plastic materials, such as polypropylene. A preferred material is MACROBLEND, available from Miles corporation, located in Pittsburgh, Pa. Other suitable materials can be readily be selected by those of ordinary skill in the art.

The upper and lower generally disk-shaped members can also be formed of suitable plastic materials. Preferably, these members are formed of heat resistant material, such as glass filled plastic resin materials. For embodiments wherein the upper and lower members are ultrasonically welded, preferred materials are those which can be ultrasonically welded, but which are also heat resistant. Suitable resins can be selected by those of ordinary skill in the art and include MINDEL glass filled resin available from Amoco of Atlanta, Ga., and VALOX glass filled resin, available from General Electric, of Pittsfield, Mass. Preferably the resins are glass filled. A preferred material is referred to as RADEL, available from Amoco, of Atlanta, Ga.

Again, as previously indicated, it will be readily understood by those of ordinary skill in the art that although the heat retentive server of the invention is referred to in preferred embodiments as being generally disk-shaped and including disk-shaped elements, the heat retentive server can be of any shape. For example, it is expressly contemplated that non-circular and non-disk-shaped embodiments are within the scope of the present invention. Thus, the heat storage member can be polygonal, including shapes which are, for example, rectangular or square.

Figure 14:
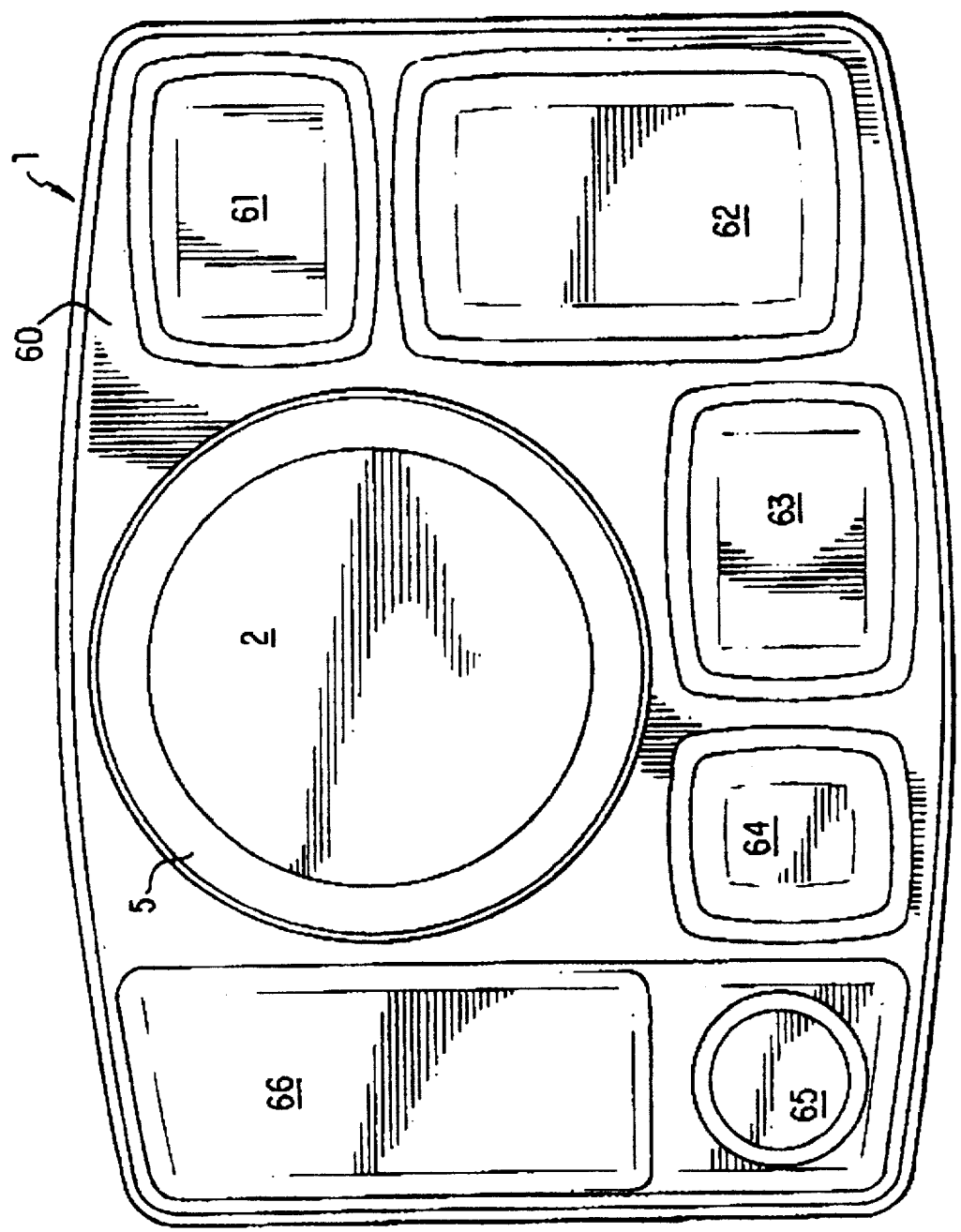
FIG. 14 is a top plan schematic view of a heat retentive server further comprising a tray portion.

In other embodiments, the ring member may have a planar expanse integrally formed therewith. For example, as is shown in FIG. 3, the ring member is also integrally formed with an element that extends to form a serving tray. Alternatively, the bottom cover portion extends to form the tray, as shown in FIG. 4. In such embodiments, the heat retentive server which is adapted to receive, e.g., a plate containing a hot meal portion, is preferably located within a substantially central portion of a tray, when the tray is viewed from the top, as is shown in FIG. 14. However, the server can be other than substantially centrally located.

Thus, referring to FIG. 3, with like elements to the embodiment of FIG. 1 being delineated with reference numerals having primes, the heat retentive server comprises a central portion 2'. The central portion comprises an upper member 4', a lower member 6' and a heat storage disk 3'. Upper member 4' is joined to lower member 6' by sonic weld joints, including inner annular joint 26', and outer annular joint 27', discussed previously.

The embodiments of FIGS. 1, 3, 4 and 4a are all similar and certain elements are common to each of these embodiments. Thus, each of these embodiments preferably includes a central portion, a heat storage disk, an upper member and a lower member, and these parts can be substantially identical to each other throughout these embodiments. However, those of ordinary skill in the art will readily recognize that there can be differences with respect to these embodiments.

The embodiment of FIG. 3 is similar to the embodiment of FIG. 1. However, in this embodiment, a bottom cover member 12 is not included. Consequently, foam insulation 15 is also omitted. However it will be readily apparent to those of ordinary skill in the art that a bottom cover member and insulation can be provided in the manner similar to the embodiment of FIG. 1. In this embodiment, a peripheral member 5' is provided, which also extends to provide a generally planar expanse 60. As used herein the term "generally planar" refers to trays and tray-like structures which comprise a generally planar array, which can comprise a flat plane, but which can also contain generally dish-shaped compartments and similar shapes, for receiving and supporting beverage containers, food dishes, napkins, flatware such as knives and forks, and the like. Such a generally planar expanse is shown in plan view in FIG. 14.

In the embodiment of FIG. 4, with like elements being indicated by reference numerals having double primes, the central portion 2" is substantially similar to the central portion 2 of FIG. 1. In the embodiment of FIG. 4, the bottom cover 12", extends to form generally planar expanse 60. As in the embodiment of FIG. 1, insulation 15" is provided in the volume defined by the bottom cover 12", central portion 2" and peripheral member 5".

In the embodiment of FIG. 4a, with like elements being indicated by reference numerals having triple primes, the central portion 2'" is substantially similar to the central portion 2 of FIG. 1. In the embodiment of FIG. 4a, the outer peripheral member 5'" extends to form the generally planar expanse 60, and bottom cover 12'" extends to and is joined by a snap-fit connection 128 at periphery 123. As in the embodiment of FIG. 1, the central portion 2'" of this embodiment comprises upper member 4'", lower member 6'" and a heat storage disk 3'" retained therebetween. The weld joints 26'" and 27'", as well as the joint between the upper member 4'", lower member 6'" and peripheral member 5'" at inner rim 7'" comprising the thermal break are substantially similar to those shown in FIGS. 1 and 12.

An embodiment of invention in which bottom cover 12 and/or peripheral member 5 extends to form a generally planar expanse is shown schematically in top plan view in FIG. 14. Thus, the heat retentive server 1 comprises a central portion and a peripheral portion 5. Generally planar portion 60 extends to provide generally dish shaped compartments 61, 62, 63, 64, 65 and 66 for receiving, supporting and retaining beverage containers, food dishes, napkins, flatware such as knives and forks, and the like.

Figure 2:
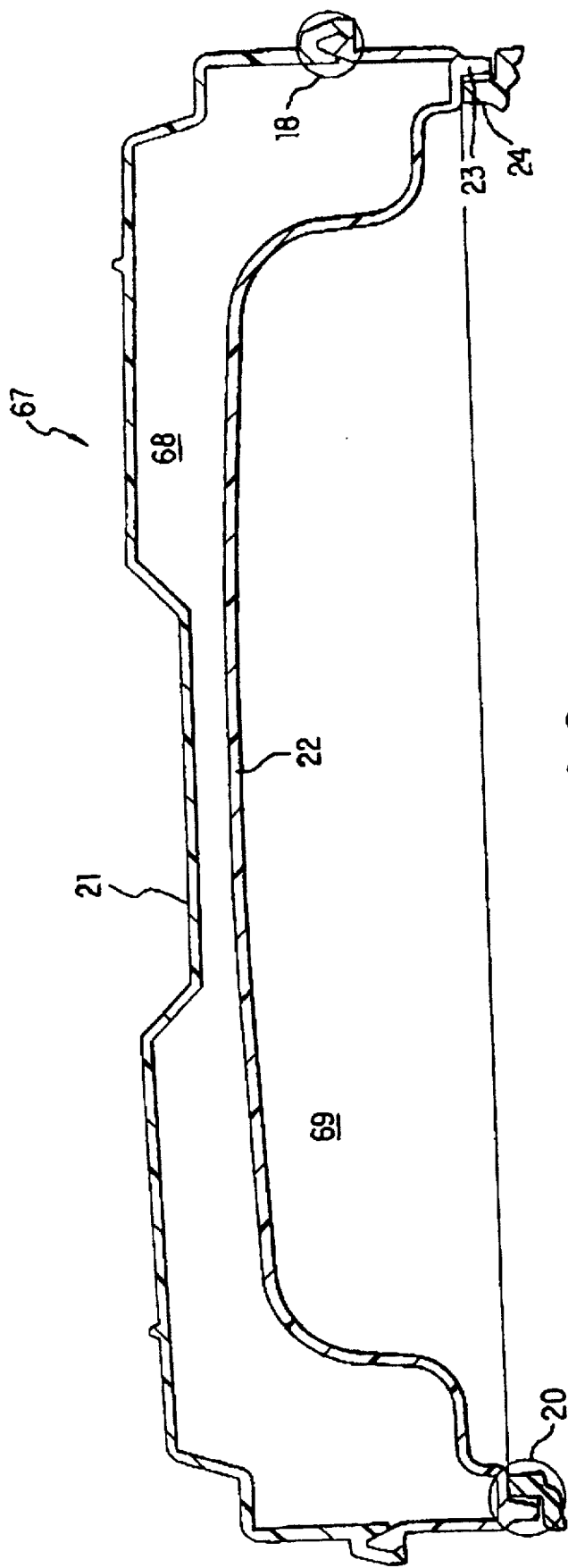
FIG. 2 is a generally transverse cross-section, taken along a plane similar to that of FIG. 1, of a heat retentive dome which is adapted to be used to cover the heat retentive server or pellet of FIG. 1.

Preferably, central portion 2 is provided with an insulated dome, such as that disclosed in FIG. 2 and designated generally as 67. Preferred structures of the dome include two walls comprising an upper wall 21 and a lower wall 22, which cooperate to define an insulated volume 68 which can comprise a space or be filed with foam. The foam is preferably the same foam as foam 15 employed between the bottom cover 12 and the central portion 2. Preferably, the upper and lower walls are joined by means of the snap-fit construction 18, described previously. Preferably, the heat retentive dome 67 includes a downwardly extending lip 23, which cooperates with upwardly extending lip 24 of the peripheral member or ring 5 shown in FIGS. 1, 3 and 4 to form joint 20, which substantially prevents heat from escaping the insulated volume 69 underneath the dome and above the central portion 2 and peripheral portion 5 of the server 1.

In method aspects, the invention involves a method of serving heated food to consumers in institutional settings, e.g., hospitals, and the like. In practice, the method involves heating the heat retentive server of the invention by subjecting it to electrical induction heating.

The induction heating of the invention is preferably conducted by placing the heat retentive server or module on a support capable of producing heat-generating electric currents, e.g., a magnetic field generated by an electric current. The basic principles of induction heating are well-known to those of ordinary skill in the art, and are disclosed for example, in U.S. Pat. No. 4,453,068 to TUCKER et al. The entirety of this patent, and all patents and publications cited therein, are hereby incorporated by reference as though set forth in full herein, for their disclosures of the basic principles and circuitry employed in induction heating. Preferred induction heating systems are described in more detail below.

One of the advantages of the present invention is that induction provides servers which can be heated extremely rapidly, which alleviates the need for workers to arrive, e.g., 60 to 90 minutes prior to meal service time.

Figure 15:
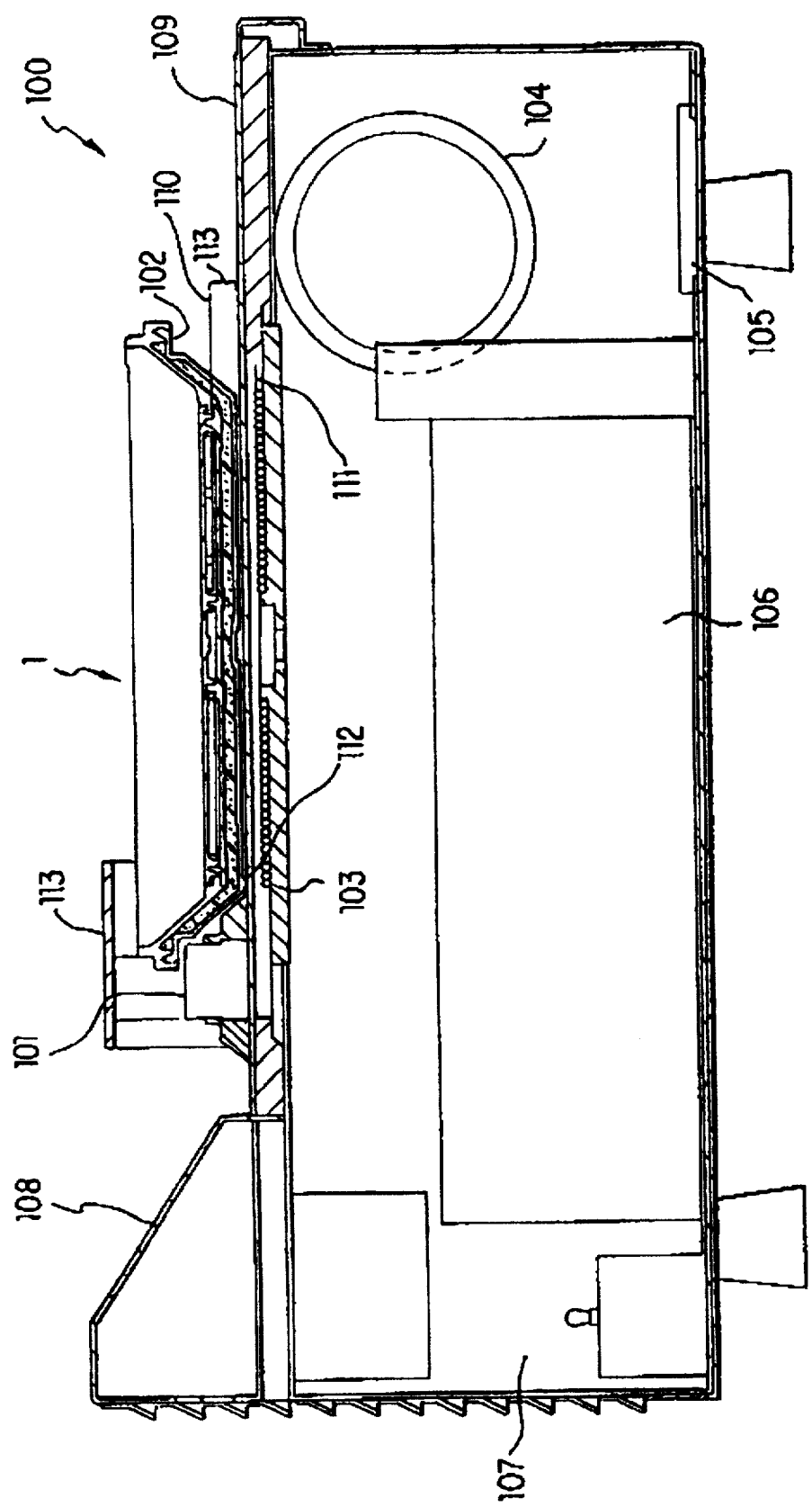
FIG. 15 is a schematic cross-section view of an induction heating unit with a heat retentive pellet of FIG. 1 positioned thereon.

The heat retentive servers or serving modules of the present invention are heated within a period of for example, from about 5 to about 15 seconds, preferably from about 8 to about 12 seconds, and most preferably about 8 seconds. Heating is preferably accomplished by placing the module of the invention on the operating surface of an induction heating system. Preferably, the system is activated, or energized in response to a proximity switch which is activated by the presence of the module of the invention. Preferably, the heating system is provided with a safety interlock system, whereby the proximity switch cannot be activated unless a guard is first displaced in response to the presence of the heat retentive server or serving module of the invention. A suitable such arrangement is shown in FIG. 15.

Preferably the servers of the invention are subjected to induction heating conditions of an intensity and for a time sufficient to heat the heat storage member to a temperature of from at least about 300° F. to about 340° F., preferably from about 310° F. to about 325° F. In general, it is preferable to heat the heat storage element to as high a temperature as possible, without subjecting the remaining components of the server to undue thermal stress.

When a metal heat storage element is employed, it is preferably heated to such a temperature range as measured by physically contacting a probe (e.g., a thermocouple) to the metal disk and conducting measurements of the temperature of the disk at various locations throughout the surface of the disk. A brief period of time is permitted in order to allow the temperature of the disk to equilibrate (i.e. to allow the heat to spread evenly throughout the volume of the disk). Equilibration is necessary before measurement because induction heating coils can generate hot spots.

Figure 13:
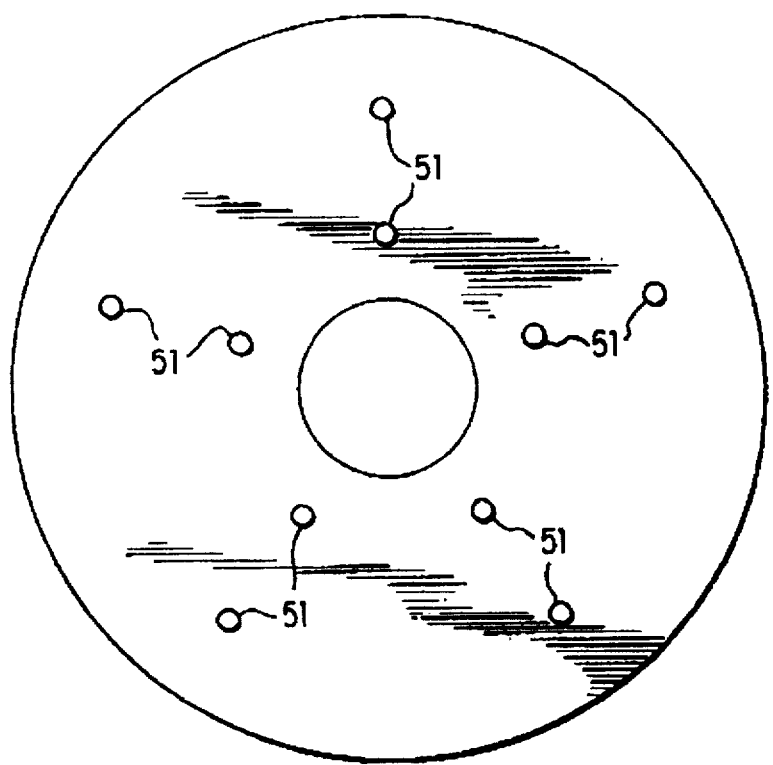
FIG. 13 is a top plan view of the heat storage member of FIGS. 1-3.

FIG. 13 shows a preferred embodiment of the heat storage disk 3. It has been found that, when a metal disk is employed, preferred results are obtained by optimizing a combination of mass of the metal disk, diameter of the metal disk, thickness of the metal disk, as well as the number of holes and diameter of holes which are present in the disk. In preferred embodiments a mass of from about 450 grams to about 475 grams is preferred, an outer diameter of about 6.4 inches to about 6.6 inches is preferred, most preferably about 6.5 inches and a thickness of about 0.117 inch to about 0.125 inch is preferred. Preferably, the metal disk should contain from about 10 to about 12 holes designated as 51, which are preferably generally round in top plan view, and the holes should have a diameter of from about 0.218 inch to about 0.225 inch.

In addition to the foregoing, the disk is preferably provided with a central hole 52 having a diameter of about 1.625 inches to about 1.640 inches. In preferred embodiments, this facilitates the formation of a central annular weld joint between the upper member 4 and lower member 6, such as annular weld joint 26, shown in FIG. 1.

Preferably, holes 51 of heat storage member 3 and pillar or post shaped members 29, together with generally truncated pillar or post shaped members 41, cooperate to form pillar or post shaped welds such that pillar or post shaped members 29 extend through holes 51. In the welding operation, the molten material of the joint preferably flows around members 29 such that the overall dimension of the welded post shaped or pillar shaped member become larger than holes 51, in portions of the joint on each side of the heat storage disk.

It has also been found that there are important considerations relating to the distance of the metal disk from the heating coil, in the practice of the invention. It has been found that it is critical that the metal disk not be located too far away from the induction coil. For example, if the disk is too far away from the induction coil, heating will not be induced. Generally, a distance of from about 0.650 inch to about 0.750 inch from the top of the induction coil to the bottom of the metal disk should be employed. This is accomplished by optimizing the thickness of the induction heating top and/or the thickness of any bottom portion of the heat retentive server. In general, the top of the induction heating unit should have a thickness which cooperates with the dimensions of the heat retentive server such that the bottom surface of the heat storage disk is located from about 0.650 inch to about 0.750 inch from the top surface of the induction coil, preferably from about 0.675 inch to about 0.725 inch, and most preferably about 0.690 inch to about 0.700 inch.

Thus, preferably the thickness of the top of the induction heating unit should be from about 0.050 inch to about 0.100 inch, preferably from about 0.060 inch to about 0.080 inch and most preferably from about 0.070 inch to about 0.075 inch. Further, the bottom surface of the heat storage member should be located from about 0.485 inch to about 0.525 inch above the surface upon which the heat retentive server is supported (i.e., distance 113), more preferably from about 0.490 inch to about 0.520 inch, and most preferably from about 0.495 inch to about 0.515 inch.

A suitable induction heating unit is illustrated schematically in FIG. 15. In FIG. 15, an induction heating unit, generally designated as 100 is shown having a heat retentive server 1 of the present invention positioned thereon. When so positioned, the server 1 interacts with a proximity switch 101. Preferably, the proximity switch is provided with a guard 113. The proximity switch and guard function as an interlock system to prevent coil 103 from being energized when a server 1 of the invention is not properly positioned on the top surface 109 of the induction heating unit 100.

The location, construction and arrangement of proximity switch 101 can be tailored to be responsive to the presence of server 1 in a configuration such as shown in FIG. 15, wherein no planar expanse 60 or tray is provided. In the embodiment of FIG. 15, the proximity switch is responsive to the generally horizontally disposed rim 102 of bottom cover 12. The proximity switch can also be responsive to peripheral member 5, or to a generally planar expanse 60, such as a tray extending form peripheral portion 5 or bottom cover 12. The induction heating unit 100 includes an induction coil 103. For embodiments such as that disclosed in FIG. 15, a suitable coil is a 2.5 KW coil with ferrite segments, or an equivalent coil, and this is preferred. Exemplary of suitable coils is that available from Fuji Electric, of Japan, and identified as Fuji part number SA407723 (A). Those of ordinary skill in the art can readily design and/or fabricate a suitable coil.

The induction heating unit also preferably includes a coil cooling fan 104 and air filter 105, each of which are fully conventional and readily available. Also included is an inverter 106. Exemplary of suitable inverters is that available from Fuji Electric, of Japan, and identified as Fuji part number HFRO5OC9K-UX. Those of ordinary skill in the art can readily design and/or fabricate a suitable inverter.

An EMI filter 107 is also preferably included. Those of ordinary skill in the art can readily design and/or fabricate a suitable filter.

Advantageously, the induction heating unit is also provided with a control panel 108.

A top surface 109 which supports server 1 above coil 103 is preferably provided. Preferably, top surface 109 is formed of a phenolic sheet, such as ED130PBK.500, available from Allied Signal Lamination Systems, of Postville, Iowa. Top surface 109 preferably has a total preferred average thickness as described above.

The structure of server 1 and top surface 109 cooperate to maintain the bottom of heat storage disk 5 at plane 110 above plane 111 at which the top of coil 103 is located. This distance between plane 110 and 111 corresponds to the preferred distance ranges between the bottom of the heat storage disk and the top of the coil, the values for which are previously given.

Preferably, to achieve the foregoing defined distance, the server is provided with feet 112. Feet 112 can be provided on bottom cover 12 as in the embodiment of FIGS. 1, 4 and 15, or on lower member 4, as in the embodiment of FIG. 3. In such embodiments, server 1 is constructed and arranged such that the distance 113 between feet 112 and the bottom of the heat storage disk 3 is as defined above.

Figure 16:
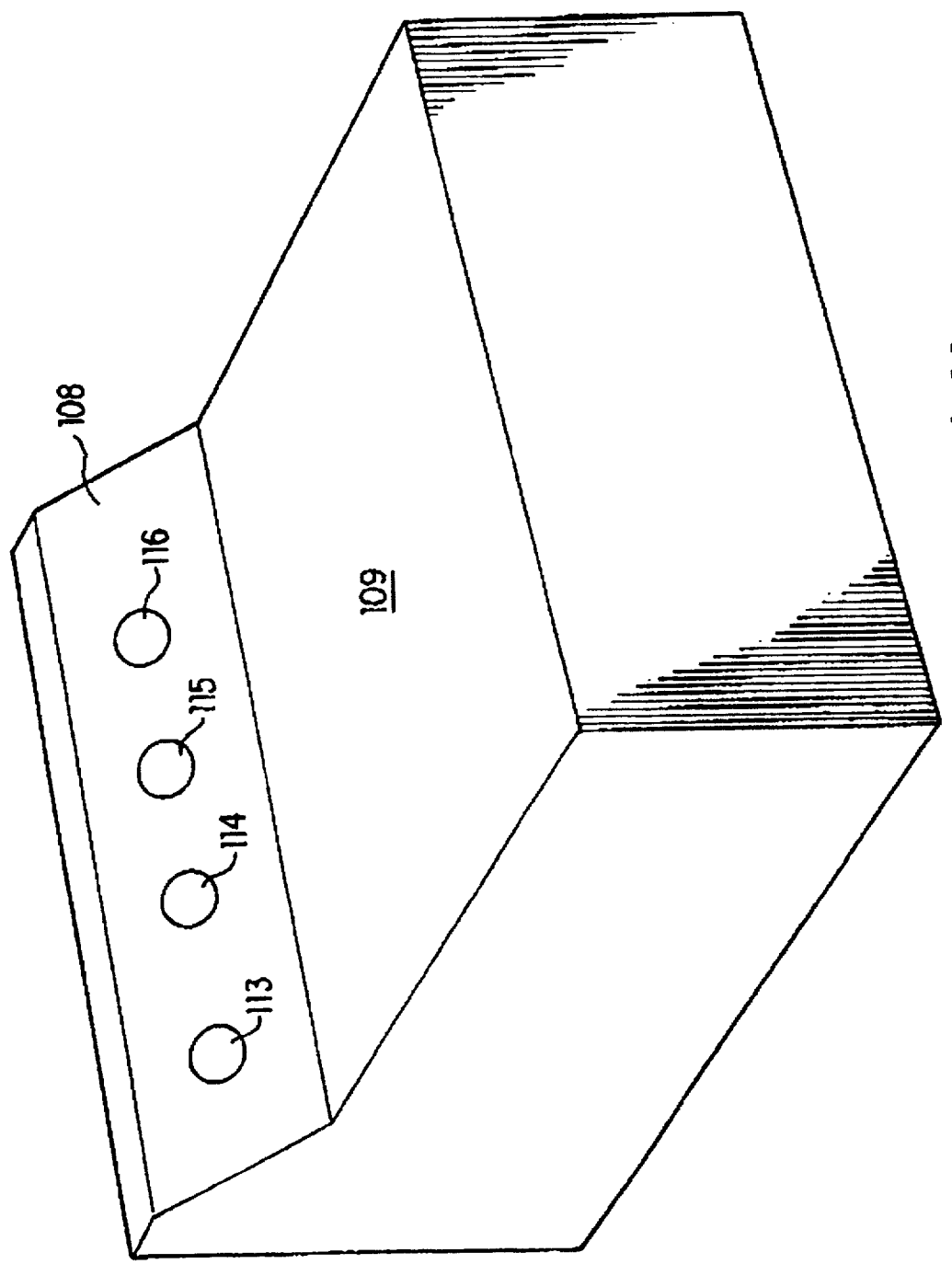
FIG. 16 is a schematic view of a control panel for an induction heating unit of FIG. 15.

A suitable control panel is shown schematically in FIG. 16. The control panel 108 includes a "power on" indicator 113, a "base heating" indicator 114, a "base ready" indicator 115 and a "call service" indicator 116. Suitable additional indicators and/or controls will be readily apparent to those of ordinary skill in the art.

In use, power to the unit is turned on and a server 1 is placed on top surface 109 of unit 100. Proximity switch 101 allows coil 103 to be energized, and base heating indicator is activated. The heat storage member 3 is heated during this interval, which has the values in the ranges defined above. When a suitable time interval has passed to bring the heat storage member 3 to the desired temperature range as discussed above, the induction coil 103 is de-energized and the base ready indicator 115 is activated. The server 1 may then be removed from unit 100, and a plate containing food therein may be placed in central portion 2. This process can be repeated sequentially many times, the number of repetitions being chiefly dependent upon the number of meals to be served. The plated food, so placed on servers, is then served to remotely-located consumers such as individuals located in the institutions described above. A holding period of finite duration will occur from the time that a plate having hot food thereon is placed on the server 1 and the time that the plate having such food in the plate is presented to the consumer. This duration will vary, depending on whether, for example, a particular server is the first or last in a series to be provided with a plate having food thereon. The duration will also be dependent upon practices which normally occur at institutions such as those described, which practices are normally variable.

Figure 17:
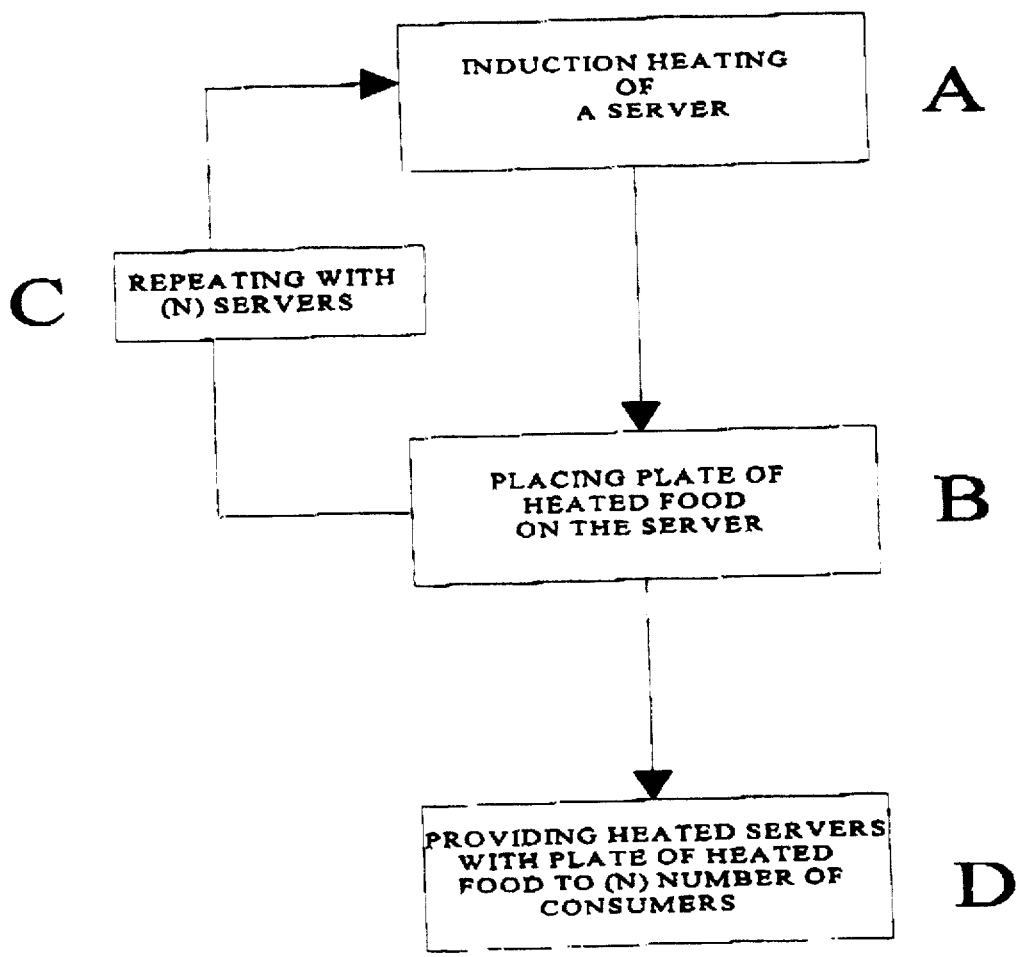
FIG. 17 is a schematic illustration of an embodiment of a method aspect of the invention.

The foregoing method is illustrated schematically in FIG. 17.

The induction heating unit 100 is preferably associated with an automated dispenser which is capable of automatically sequentially placing inductively heated servers of the invention on top surface 109 of unit 100 above induction coil 103. The automated dispenser is also preferably adapted to sequentially remove each heated server 1 from the induction unit 100, after the proper amount of time has elapsed for heating each server 1.

The foregoing embodiments are described in an illustrative, rather than a limitative sense. From the foregoing description, one skilled in the art can easily ascertain the essential characteristics of this invention, and without departing from the spirit and scope thereof, can make various changes and modifications of the invention to adapt it to various usages and conditions. Thus, the heat retentive server can be modified to include, for example, embodiments wherein upper member 4 functions as a dish to support heated food.

What is claimed is:

1. A transportable heat retentive server for satellite food service adapted to be rapidly inductively heated comprising:
   a central portion, for receiving an article of dishware for serving hot food to a consumer, comprising a heat storage member comprising a material which is susceptible to being heated by induction, and an upper non-metallic surface above said heat storage member; and
   an outer peripheral member connected to said central portion by an expansion joint:
   said central portion and said peripheral portion at least partially defining a volume within which an article of dishware containing food may be placed:
   whereby said heat storage member can be rapidly charged with heat and said upper non-metallic surface slows the dissipation of the heat in the heat storage member to said volume.

2. The heat retentive server of claim 1, wherein said central portion further comprises an upper member and a lower member, and said peripheral member comprises an outer generally ring-shaped member connected to said central portion by at least one of said upper and lower members.

3. The heat retentive server of claim 2, wherein said generally ring-shaped member is substantially insulated from at least one of said upper member and said lower member by a thermal break.

4. The heat retentive server of claim 2, further comprising a bottom cover member secured to said generally ring-shaped member.

5. The heat retentive server of claim 4, wherein said generally ring-shaped member further comprises an outer rim portion and an inner rim portion and said bottom cover member is secured to said generally ring-shaped member at said outer rim portion.

6. The heat retentive server of claim 5, wherein said lower member and said bottom cover member define a volume of space therebetween, and said volume is substantially filled with expanded foam insulation material, and said expanded foam insulation material is positioned to force together said interlocking snap-fit connection.

7. The heat retentive server of claim 4, wherein said bottom cover member is secured to said generally ring-shaped member by an interlocking snap fit connection.

8. The heat retentive server of claim 4, further comprising an insulation material disposed between said lower generally disk-shaped member and said bottom cover member.

9. The heat retentive server of claim 4, wherein said lower generally disk-shaped member and said bottom cover member define a volume of space therebetween and said volume is substantially filled with said insulation material.

10. The heat retentive server of claim 9, wherein said insulation material comprises foam.

11. The heat retentive server of claim 4, further comprising a generally planar, substantially horizontal expanse extending radially outward from said bottom cover.

12. The heat retentive server of claim 11, wherein said bottom cover further comprises an outer rim portion and said generally planar expanse extends from said outer rim portion.

13. The heat retentive server of claim 12, wherein said generally planar expanse comprises a serving tray.

14. The heat retentive server of claim 13, further comprising a top cover.

15. The heat retentive server of claim 2, further comprising an insulation material disposed between said heat storage member and said lower member.

16. The heat retentive server of claim 2, wherein said outer generally ring-shaped member further comprises a generally planar substantially horizontal expanse extending from said generally ring shaped member.

17. The heat retentive server of claim 16, wherein said generally planar horizontal expanse comprises a serving tray.

18. The heat retentive server of claim 17, further comprising a top cover.

19. The heat retentive server of claim 2, wherein said generally disk-shaped heat storage member comprises a ferrometallic material.

20. The heat retentive server of claim 19, wherein said ferrometallic material is an iron alloy.

21. The heat retentive server of claim 20, wherein said iron alloy comprises steel.

22. The heat retentive server of claim 21, wherein said heat storage member has a mass of from about 450 grams to about 475 grams, an outer diameter of about 6.4 inches to about 6.6 inches, a thickness of about 0.117 inch to about 0.125 inch, and comprises from about 10 to about 12 holes having a diameter of from about 0.218 inch to about 0.225 inch, and a central hole having a diameter of about 1.625 inches to about 1.640 inches.

23. The heat storage member of claim 2, wherein said upper member, said lower member and said heat storage member are generally disk-shaped and circular in plan view, and said outer generally ring-shaped member is circular in plan view.

24. The heat storage member of claim 23, wherein said upper generally disk-shaped member, said lower generally disk-shaped member, said outer generally ring-shaped member and said generally disk-shaped heat storage member are circular in plan view and said ring-shaped member further comprises a generally rectangular tray integral with said ring-shaped member.

25. The heat retentive server of claim 2, wherein said upper member and said lower member are integrally molded so as to substantially envelop said heat storage member.

26. The heat retentive server of claim 1, wherein said outer peripheral member and said central heat storage member are connected to each other such that a substantial proportion of said outer peripheral member is not in contact with said central portion.

27. The transportable heat retentive server of claim 1, wherein said upper non-metallic surface comprises a plastic material.

28. The heat retentive server of claim 1, further comprising a top cover, which further defines the volume within which the article of dishware containing food may be placed.

29. The heat retentive server of claim 28, wherein said top cover and said central portion define a substantially insulated volume.

30. The heat retentive server of claim 29, wherein said top cover comprises two walls and said walls are spaced from each other to define an insulating space therebetween and within said top cover.

31. A transportable heat retentive server for satellite food service comprising:
a central portion comprising an upper generally disk-shaped non-metallic portion, a lower generally disk-shaped non-metallic portion and a generally disk-shaped heat storage member disposed between said upper generally disk-shaped portion and said lower generally disk-shaped portion;
said upper generally disk-shaped central portion having an upper generally planar surface for supporting a food service dish, and a lower generally planar surface;
said lower generally disk-shaped member being secured to the lower generally planar surface of said upper generally disk-shaped member;
said generally disk-shaped heat storage member comprising a material which is susceptible to being heated by electrical induction heating; and
an outer generally ring-shaped member comprising an inner rim portion which is retained between said upper generally disk-shaped member and said lower generally disk-shaped member and which is connected to said upper and lower generally disk shaped members by an expansion joint;
the heat retentive server being constructed and arranged so that the heat storage member can be rapidly charged with heat by an induction heating unit and food contained on the pellet base can be maintained hot for delivery to a consumer located remotely from the induction heating unit.

32. The heat retentive server of claim 31, wherein said inner rim portion of said generally ring-shaped member is retained in a generally annular volume defined by said upper generally disk-shaped member and said lower generally disk-shaped member, such that a substantial proportion of said inner rim portion of said generally ring-shaped member is not in contact with said upper generally disk-shaped member or said lower generally disk shaped member.

33. The heat retentive server of claim 32, wherein said annular volume is at least partially filled with a sealing compound.

34. The heat retentive server of claim 31, wherein said generally disk-shaped heat storage member comprises steel and has a mass of from about 450 grams to about 475 grams, an outer diameter of about 6.4 inches to about 6.6 inches, a thickness of about 0.117 inch to about 0.125 inch, and comprises from about 10 to about 12 holes having a diameter of from about 0.218 inch to about 0.225 inch, and a central hole having a diameter of about 1.625 inches to about 1.640 inches.

35. The transportable heat retentive server of claim 31, wherein said upper generally disk-shaped non-metallic portion and said lower generally disk-shaped non-metallic portion comprise a plastic material.

36. A transportable heat retentive serving module adapted to be rapidly inductively heated comprising:
a central portion, for receiving an article of dishware for serving hot food to a consumer, comprising a heat storage member comprising a material which is susceptible to being heated by induction when said server is placed on an induction heating unit, and an upper non-metallic surface above said heat storage member; and
an outer peripheral member connected to said central portion by an expansion joint so that said outer peripheral member and said central portion are substantially thermally insulated from each other;
said serving module being constructed and arranged such that a plurality of such serving modules can be heated sequentially by being sequentially placed on said induction heating unit, and such that hot food thereafter placed in said server on said article of dishware is maintained hot for a period of time sufficient to allow said hot food to be served to a consumer remotely located from said induction heating unit while said food is hot.

37. The heat retentive server of claim 36, wherein said outer peripheral member and said central heat storage member are connected to each other such that a substantial proportion of said outer peripheral member is not in contact with said central portion.

38. The heat retentive server of claim 36, further comprising insulation material constructed and arranged with respect to said heat storage member so that heat is primarily caused to flow upwardly from said heat storage member.

39. The transportable heat retentive server of claim 36, wherein said upper non-metallic surface comprises a plastic material.

40. A transportable heat retentive server adapted to be inductively heated comprising:
a central portion comprising a heat storage member comprising a material which is susceptible to being heated by induction and which is capable of releasing heat generated by induction to heated food placed above said central portion, and an upper non-metallic surface above said heat storage member;

an outer peripheral member formed of a plastics material and connected with said central portion: and an expansion joint disposed between said outer peripheral member and said heat storage member;

said heat retentive server being constructed and arranged such that said heat storage member can be rapidly heated by induction heating to a temperature of at least about 300° F. and said peripheral member may be safely manually handled and touched when said heat storage member has been heated to said temperature by induction heating.

41. The heat retentive server of claim 40, wherein said outer peripheral member is formed of a blend comprising polyester and polycarbonate.

42. The heat retentive server of claim 40, wherein said outer peripheral member is formed of a polyolefin-based plastic material.

43. The heat retentive server of claim 40, wherein said temperature is at least about 310° F.

44. The heat retentive server of claim 43, wherein said temperature is at least about 325° F.

45. The heat retentive server of claim 40, wherein said heat storage member can be heated to said temperature in a period of from about 5 to about 15 seconds.

46. The heat retentive server of claim 45, wherein said heat storage member can be heated to said temperature in a period of from about 8 to about 12 seconds.

47. The heat retentive server of claim 40, wherein said heat storage member is formed of metal, and has a mass of from about 450 grams to about 475 grams.

48. The heat retentive server of claim 40, wherein said heat storage member is generally disk-shaped and comprises a material which is susceptible to being heated by induction and said generally disk-shaped heat storage member has a mass of from about 450 grams to about 475 grams, an outer diameter of about 6.4 inches to about 6.6 inches, a thickness of about 0.117 inch to about 0.125 inch, and comprises from about 10 to about 12 holes having a diameter of from about 0.218 inch to about 0.225 inch, and a central hole having a diameter of about 1.625 inches to about 1.640 inches.

49. The transportable heat retentive server of claim 48, wherein said upper non-metallic surface comprises a plastic material.

50. A transportable heat retentive server adapted to be inductively heated comprising:

a central portion comprising a generally disk-shaped heat storage member comprising a material which is susceptible to being heated by induction and said generally disk-shaped heat storage member having a mass of from about 450 grams to about 475 grams, an outer diameter of about 6.4 inches to about 6.6 inches, a thickness of about 0.117 inch to about 0.125 inch, and comprising from about 10 to about 12 holes having a diameter of from about 0.218 inch to about 0.225 inch, and a central hole having a diameter of about 1.625 inches to about 1.640 inches;

an upper non-metallic surface above said heat storage member; and an outer peripheral member connected to said central portion.

51. In combination, a heat retentive server adapted for induction heating, and an induction unit;

said heat retentive server comprising a central portion, for receiving an article of dishware for serving hot food to a consumer, comprising a heat storage member comprising a material which is susceptible to being heated by induction, and an upper non-metallic surface above said heat storage mass; and an outer peripheral member connected to said central portion by an expansion joint;

said central portion and said peripheral portion at least partially defining a volume within which an article of dishware containing food may be placed; whereby said heat storage member can be rapidly charged with heat and said upper non-metallic surface slows the dissipation of the heat in the heat storage member to said volume; and said induction unit comprising an induction coil, said induction coil comprising a top surface, wherein said heat storage member comprises a bottom surface and said heat retentive server and said induction heating unit are constructed and arranged such that said bottom surface of said heat storage member is spaced a distance of from about 0.650 inch to about 0.750 inch above said top surface of said induction heating coil.

52. The combination of claim 51, wherein said induction heating unit has a top surface, and said heat retentive server is constructed and arranged such that said bottom surface of said heat storage member is spaced from about 0.485 inch to about 0.525 inch above said top surface of said induction heating unit.

53. The combination of claim 52, wherein said heat retentive server comprises heat insulation, and said heat insulation is disposed between said bottom surface of said heat storage member and said top surface of said induction heating unit.

54. A method of mass serving food to a given number of consumers to be served a meal, the method comprising:

A. subjecting a single heat retentive server comprising a heat storage member susceptible to electrical induction heating, and an outer peripheral member, to an electromagnetic field sufficient to inductively heat said heat storage member to a temperature sufficient to maintain hot food, placed in the heated heat retentive server, hot;

B. placing a quantity of heated food on the heated heat retentive server of A;

C. repeating A and B a number of times to provide a plurality of heated servers, said number of times substantially relating to said number of consumers to be served a meal;

D. serving said heated heat retentive servers to said consumers from said plurality of heated servers;

wherein said heat retentive server comprises a central portion, for receiving an article of dishware for serving hot food to a consumer, comprising a heat storage member comprising a material which is susceptible to being heated by induction; and an outer peripheral member connected to said central portion.

55. The method of claim 54, wherein said outer peripheral member is connected to said central portion by an expansion joint.

56. The method of claim 55, wherein said expansion joint comprises a thermal break.

57. The method of claim 54, wherein said central portion comprises an upper generally disk-shaped non-metallic portion, a lower generally disk-shaped non-metallic portion and said heat storage member is disk-shaped and disposed between said upper generally disk-shaped portion and said lower generally disk-shaped portion.

58. The method of claim 54, wherein said heat storage member comprises a ferrometallic material.

59. The method of claim 58, wherein said heat storage member comprises an iron alloy.

60. The method of claim 59, wherein said heat storage member comprises steel.

61. The method of claim 58, wherein said upper generally disk-shaped portion and said lower generally disk-shaped portion comprise plastic material.

62. The method of claim 61, wherein said temperature of A is at least about 310° F. and A is conducted for a period of about 5 to about 15 seconds.

63. The method of claim 62, wherein said temperature of A is at least about 325° F. and said period is from about 8 to about 12 seconds.

64. The method of claim 62, wherein said method further comprises a holding period prior to D and said holding period is from about 5 to about 75 minutes.

65. The method of claim 64, wherein said holding period is from about 10 to about 45 minutes.

* * * * *